US012804527B2

(12) United States Patent
Fujishiro

(10) Patent No.: US 12,804,527 B2
(45) Date of Patent: Nov. 17, 2026

(54) COMMUNICATION CONTROL METHOD

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 273 days.

(21) Appl. No.: 17/822,371

(22) Filed: Aug. 25, 2022

(65) Prior Publication Data

US 2022/0408352 A1 Dec. 22, 2022

Related U.S. Application Data

(63) Continuation of application No. PCT/JP2021/006269, filed on Feb. 19, 2021.

(30) Foreign Application Priority Data

Feb. 26, 2020 (JP) ................................ 2020-030893

(51) Int. Cl.
*H04W 48/18* (2009.01)
*H04W 48/10* (2009.01)

(52) U.S. Cl.
CPC .......... *H04W 48/18* (2013.01); *H04W 48/10* (2013.01)

(58) Field of Classification Search
CPC . H04W 36/13; H04W 48/20; H04W 36/0079; H04W 36/0085; H04W 36/305; H04W 36/34; H04W 36/0077; H04W 48/18; H04W 84/042; H04W 28/16; H04W 36/0027; H04W 36/0066; H04W 36/30; H04W 48/14; H04W 76/10; H04W 76/11; H04W 76/27; H04W 8/12; H04W 84/00; H04W 48/10
See application file for complete search history.

(56) References Cited

U.S. PATENT DOCUMENTS 10,904,799 B2 1/2021 Fujishiro
11,026,149 B1 * 6/2021 Goel .................... H04W 48/20
11,051,173 B2 6/2021 Lou et al.
11,317,369 B2 * 4/2022 Chun .................... H04W 60/00
11,758,459 B2 * 9/2023 Goel .................. H04W 36/305
455/436
12,581,445 B2 * 3/2026 Velev .................... H04W 48/20
(Continued)

FOREIGN PATENT DOCUMENTS

CN 109845338 A * 6/2019 ........... H04W 48/10
EP 3624483 A1 * 3/2020 ........... H04W 24/02
(Continued)

OTHER PUBLICATIONS

U.S. Appl. No. 62/969,006 (Year: 2020).*
(Continued)

*Primary Examiner* — Matthew C Sams
(74) *Attorney, Agent, or Firm* — Studebaker Brackett PLLC

(57) ABSTRACT

A communication control method includes transmitting, by a user equipment connecting to a first base station belonging to a non-public cellular network, to the first base station, a message for the user equipment to perform connection switching from the non-public cellular network to a public cellular network, and performing, by the first base station, control for the connection switching based on the message received from the user equipment.

7 Claims, 14 Drawing Sheets

NPN INFORMATION STORED IN SIM

| NPN ID (CAG ID) | FREQUENCY INFORMATION | PRIORITY |
|---|---|---|
| ID#1 | FREQUENCY #1 | 1 |
| ID#2 | FREQUENCY #2 | 2 |

(56) References Cited

U.S. PATENT DOCUMENTS

| | | | | |
|---|---|---|---|---|
| 2012/0115469 | A1 | 5/2012 | Chen et al. | |
| 2018/0288654 | A1* | 10/2018 | Shih | H04W 48/14 |
| 2019/0014515 | A1* | 1/2019 | Zee | H04W 36/0027 |
| 2019/0028941 | A1* | 1/2019 | Zee | H04W 36/0077 |
| 2020/0022095 | A1* | 1/2020 | Kim | H04W 8/08 |
| 2020/0120547 | A1* | 4/2020 | Han | H04W 36/0083 |
| 2020/0145967 | A1* | 5/2020 | Park | H04W 72/23 |
| 2020/0267638 | A1* | 8/2020 | Ni | H04L 63/0876 |
| 2021/0037455 | A1* | 2/2021 | Zhu | H04W 76/27 |
| 2021/0092725 | A1* | 3/2021 | Park | H04W 76/27 |
| 2021/0112460 | A1 | 4/2021 | Fujishiro | |
| 2021/0112513 | A1* | 4/2021 | Chun | H04W 60/00 |
| 2021/0219226 | A1 | 7/2021 | Liao et al. | |
| 2021/0250835 | A1* | 8/2021 | Goel | H04W 36/0079 |
| 2021/0297844 | A1* | 9/2021 | Prabhakar | H04W 48/18 |
| 2021/0321264 | A1 | 10/2021 | Lou et al. | |
| 2022/0007267 | A1* | 1/2022 | Maattanen | H04W 8/26 |
| 2022/0167228 | A1* | 5/2022 | Li | H04W 36/0077 |
| 2022/0201592 | A1* | 6/2022 | Lindheimer | H04W 48/10 |
| 2023/0319700 | A1* | 10/2023 | Prabhakar | H04W 84/12 455/432.1 |

FOREIGN PATENT DOCUMENTS

| | | | | |
|---|---|---|---|---|
| EP | 3846515 | A1 * | 7/2021 | H04W 36/0061 |
| EP | 3866498 | A2 * | 8/2021 | H04W 76/50 |
| JP | 2013-197969 | A | 9/2013 | |
| JP | 2013-544054 | A | 12/2013 | |
| JP | 2020-505890 | A | 2/2020 | |
| WO | 2017/204067 | A1 | 11/2017 | |
| WO | WO-2019070100 | A1 * | 4/2019 | H04W 60/00 |
| WO | 2020/037086 | A1 | 2/2020 | |
| WO | 2021/053827 | A1 | 3/2021 | |
| WO | WO-2022036542 | A1 * | 2/2022 | H04W 48/12 |
| WO | WO-2023057980 | A1 * | 4/2023 | H04W 48/10 |

OTHER PUBLICATIONS

Samsung, "NW selection considering RAN sharing for NPNs", 3GPP SA WG2 Meeting #132, S2-1904663, Xi'an, China, Apr. 8-12, 2019.

3GPP Technical Report TR 23.734 V16.1.0, "Study on enhancement of 5G system (5GS) for vertical and Local Area Network (LAN) services", Mar. 2019.

Huawei, Hisilicon, "Discussion on handover cases", 3GPP TSG-RAN WG2 #107 R2-1911055, Prague, Czech Republic Aug. 26-30, 2019, section 2.2.2.

Huawei, "Handover for public network integrated NPN", 3GPP TSG-RAN WG3 #105 R3-194419, Ljubljana, Sloveniaaaaa, Aug. 26-30, 2019, section 2.3.

Huawei, Hisilicon, China Telecom, "General considerations on connected mode for NPN", 3GPP TSG-RAN WG2 #109_e R2-2001377, Feb. 24-Mar. 6, 2020, section 2.2.

Huawei, "(TP for NPN BL CR for TS 38.300): Support of RAN sharing with NPN", 3GPP TSG-RAN WG3 #107_e R3-200725, Feb. 24-Mar. 6, 2020, Introduction.

CATT, "Idle and Inactive Open Issues for NPN", 3GPP TSG-RAN WG2 #109_e R2-2000004, Feb. 24-Mar. 6, 2020, section 2.1.

Nokia, Nokia Shanghai Bell, Ericsson, "Vertical_LAN NPN related CR for non-FASMO corrections", 3GPP TSG SA WG2 #137e S2-2002213, Elbonia, Feb. 24-27, 2020, section 5.30.2.4.

* cited by examiner

NPN INFORMATION STORED IN SIM

| NPN ID (CAG ID) | FREQUENCY INFORMATION | PRIORITY |
|---|---|---|
| ID#1 | FREQUENCY #1 | 1 |
| ID#2 | FREQUENCY #2 | 2 |

FIG. 7

COMMUNICATION CONTROL METHOD

RELATED APPLICATIONS

The present application is a continuation based on PCT Application No. PCT/JP2021/006269, filed on Feb. 19, 2021, which claims the benefit of Japanese Patent Application No. 2020-030893 filed on Feb. 26, 2020. The content of which is incorporated by reference herein in their entirety.

TECHNICAL FIELD

The present invention relates to a communication control method used in a cellular communication system.

BACKGROUND ART

NPL 1 describes a technology of configuring a small-scale non-public cellular network (Non-Public Network (NPN)) available for specific subscribers in the fifth generation (5G) cellular communication system. Such a non-public cellular network is also referred to as a private network, and for example, a use case of being used for private wireless communication in a factory is assumed.

CITATION LIST

Non-Patent Literature

NPL 1: 3GPP Technical Report TR 23.734 V16.1.0, "Study on enhancement of 5G System (5GS) for vertical and Local Area Network (LAN) services", March 2019

SUMMARY OF INVENTION

A communication control method according to a first aspect includes transmitting, by a first base station that manages a first cell belonging to a first cellular network, to a user equipment in the first cell, network information related to a second cellular network associated with the first cell. The network information includes information indicating whether there is network cooperation or whether an inter-base station interface is present between the first base station and a second base station that manages a second cell belonging to the second cellular network. The first cellular network includes one of a public cellular network and a non-public cellular network, and the second cellular network includes another one of the public cellular network and the non-public cellular network.

A communication control method according to a second aspect includes transmitting, by a user equipment connecting to a first base station belonging to a non-public cellular network, to the first base station, a message for the user equipment to perform connection switching from the non-public cellular network to a public cellular network, and performing, by the first base station, control for the connection switching based on the message received from the user equipment.

A communication control method according to a third aspect includes managing, by a base station, a cell shared by a first cellular network and a second cellular network, and transmitting, by a user equipment, to the base station, information for designating one of the first cellular network and the second cellular network as a connection destination network of the user equipment. The first cellular network includes one cellular network of three cellular networks: a public cellular network, a standalone non-public cellular network, and a non-standalone non-public cellular network. The second cellular network includes one of two cellular networks obtained by excluding the one cellular network from the three cellular networks.

A communication control method according to a fourth aspect includes managing, by a base station, a cell shared by a first cellular network and a second cellular network, and performing, by a user equipment connected to the base station, network switching processing for switching from the first cellular network to the second cellular network without changing the cell. The first cellular network includes one cellular network of three cellular networks: a public cellular network, a standalone non-public cellular network, and a non-standalone non-public cellular network. The second cellular network includes one of two cellular networks obtained by excluding the one cellular network from the three cellular networks.

A communication control method according to a fifth aspect includes broadcasting, by a base station, system information including a network identifier allocated to a non-public cellular network and a service type identifier indicating a type of service provided by the non-public cellular network, and selecting, by a user equipment, based on the system information, the non-public cellular network providing a predetermined type of service as a network where the user equipment is to be connected.

BRIEF DESCRIPTION OF DRAWINGS

FIG. 7 is a diagram illustrating NPN information stored in a SIM according to an embodiment.

DESCRIPTION OF EMBODIMENTS

In a situation where public cellular networks and non-public cellular networks are mixed, implementation of a technique that allows user equipment to properly utilize a non-public cellular network is desired.

In the light of this, the present disclosure has an object to enable user equipment to properly use a non-public cellular network.

A cellular communication system according to an embodiment will be described with reference to the drawings. In the description of the drawings, the same or similar parts are denoted by the same or similar reference signs.

Cellular Communication System

First, a configuration of a cellular communication system according to an embodiment will be described. A cellular communication system according to an embodiment is a 5G system of the 3rd Generation Partnership Project (3GPP). However, LTE may be at least partially applied to the cellular communication system.

Figure 1:
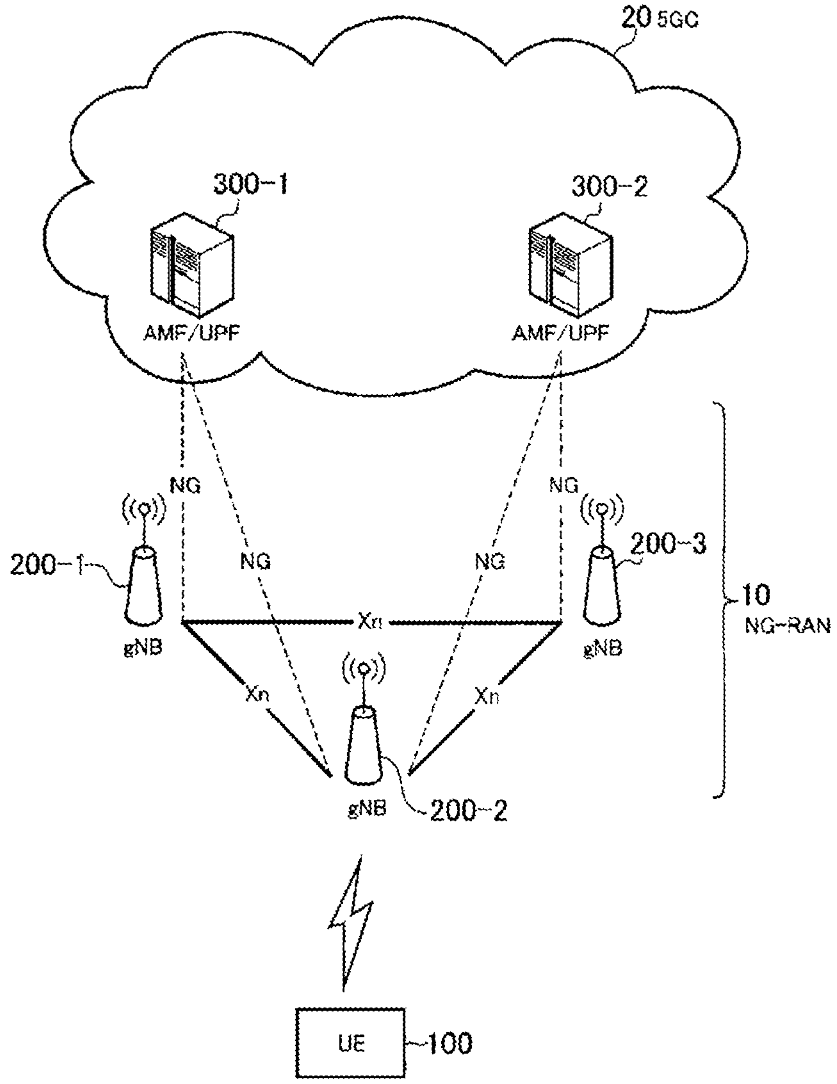
FIG. 1 is a diagram illustrating a configuration of a cellular communication system according to an embodiment.

FIG. 1 is a diagram illustrating a configuration of the cellular communication system according to an embodiment.

As illustrated in FIG. 1, the cellular communication system includes a User Equipment (UE) 100, a 5G radio access network (Next Generation Radio Access Network (NG-RAN)) 10, and a 5G Core Network (5GC) 20.

The UE 100 is a mobile apparatus. The UE 100 may be any apparatus utilized by a user. Examples of the UE 100 include a mobile phone terminal (including a smartphone), a tablet terminal, a notebook PC, a communication module (including a communication card or a chipset), a sensor or an apparatus provided on a sensor, a vehicle or an apparatus provided on a vehicle (Vehicle UE), and/or a flying object or an apparatus provided on a flying object (Aerial UE).

The NG-RAN 10 includes base stations (referred to as "gNBs" in the 5G system) 200. The gNBs 200 may also be referred to as NG-RAN nodes. The gNBs 200 are connected to each other via an Xn interface which is an inter-base station interface. Each gNB 200 manages one or a plurality of cells. The gNB 200 performs wireless communication with the UE 100 that has established a connection with the cell managed by the gNB 200. The gNB 200 has a radio resource management (RRM) function, a function of routing user data (hereinafter simply referred to as "data"), and/or a measurement control function for mobility control and scheduling. A "cell" is used as a term to indicate a minimum unit of a wireless communication area. A "cell" is also used as a term to indicate a function or a resource for performing wireless communication with the UE 100. One cell belongs to one carrier frequency.

Note that the gNB may be connected to an Evolved Packet Core (EPC) which is a core network of LTE, or a base station of LTE may be connected to the 5GC. Moreover, the base station of LTE and the gNB may be connected via the inter-base station interface.

The 5GC 20 includes an Access and Mobility Management Function (AMF) and a User Plane Function (UPF) 300. The AMF performs various kinds of mobility control and the like for the UE 100. The AMF manages information of the area in which the UE 100 exists by communicating with the UE 100 by using Non-Access Stratum (NAS) signaling. The UPF controls data transfer. The AMF and UPF are connected to the gNB 200 via an NG interface which is an interface between a base station and the core network.

Figure 2:
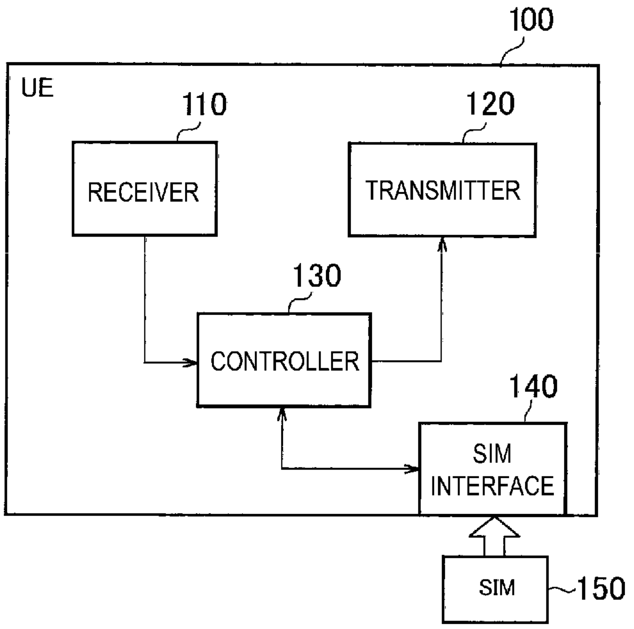
FIG. 2 is a diagram illustrating a configuration of a user equipment (UE) according to an embodiment.

FIG. 2 is a diagram illustrating a configuration of the UE 100 (user equipment).

As illustrated in FIG. 2, the UE 100 includes a receiver 110, a transmitter 120, a controller 130, and a Subscriber Identification Module (SIM) interface 140.

The receiver 110 performs various kinds of receptions under control of the controller 130. The receiver 110 includes an antenna and a reception device. The reception device converts a radio signal received by the antenna into a baseband signal (a reception signal) and outputs the resulting signal to the controller 130.

The transmitter 120 performs various kinds of transmissions under control of the controller 130. The transmitter 120 includes an antenna and a transmission device. The transmission device converts a baseband signal output by the controller 130 (a transmission signal) into a radio signal and transmits the resulting signal through the antenna.

The controller 130 performs various kinds of controls for the UE 100. The controller 130 includes at least one processor and at least one memory electrically connected to the processor. The memory stores programs to be executed by the processor and information to be used for processes by the processor. The processor may include a baseband processor and a Central Processing Unit (CPU). The baseband processor performs modulation and demodulation, and coding and decoding of a baseband signal, and the like. The CPU executes the programs stored in the memory to perform various types of processes.

A SIM 150 is connected to the SIM interface 140. The SIM 150 may be referred to as a User Identity Module (UIM) or a Universal Integrated Circuit Card (UICC).

In the SIM 150, information for identifying a subscriber, carrier identification information for identifying a communication carrier, information related to available services that a subscriber has a contract with, and the like are stored. Further, in the SIM 150, information necessary for receiving services is stored. The information necessary for receiving services include, for example, information used to register position information and/or information related to a telephone number.

The SIM interface 140 may allow loading and removal of the SIM 150. Alternatively, the SIM 150 may be an Embedded SIM (eSIM). When reading and writing of information is requested from the controller 130, the SIM interface 140 reads information stored in the SIM 150 and writes information to the SIM 150.

Figure 3:
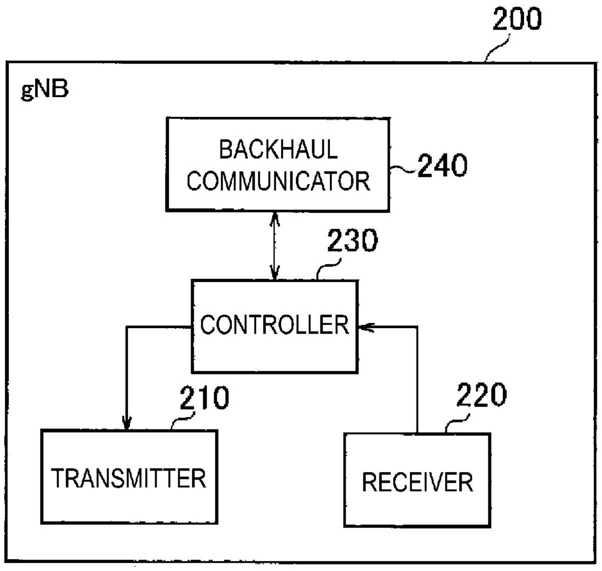
FIG. 3 is a diagram illustrating a configuration of a base station (gNB) according to an embodiment.

FIG. 3 is a diagram illustrating a configuration of the gNB 200 (a base station).

As illustrated in FIG. 3, the gNB 200 includes a transmitter 210, a receiver 220, a controller 230, and a backhaul communicator 240.

The transmitter 210 performs various kinds of transmissions under control of the controller 230. The transmitter 210 includes an antenna and a transmission device. The transmission device converts a baseband signal output by the controller 230 (a transmission signal) into a radio signal and transmits the resulting signal through the antenna.

The receiver 220 performs various kinds of receptions under control of the controller 230. The receiver 220 includes an antenna and a reception device. The reception device converts a radio signal received through the antenna into a baseband signal (a reception signal) and outputs the resulting signal to the controller 230.

The controller 230 performs various types of control for the gNB 200. The controller 230 includes at least one processor and at least one memory electrically connected to the processor. The memory stores programs to be executed by the processor and information to be used for processes by the processor. The processor may include a baseband processor and a CPU. The baseband processor performs modulation and demodulation, and coding and decoding of a baseband signal, and the like. The CPU executes the programs stored in the memory to perform various types of processes.

The backhaul communicator 240 is connected to a neighboring base station via the inter-base station interface. The backhaul communicator 240 is connected to the AMF/UPF 300 via the interface between a base station and the core network. Note that the gNB may include a Central Unit (CU) and a Distributed Unit (DU) (i.e., functions are divided), and the two units may be connected via an F1 interface.

Figure 4:
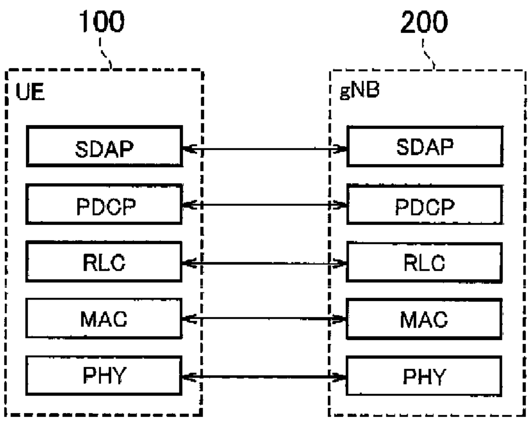
FIG. 4 is a diagram illustrating a configuration of a protocol stack of a radio interface for a user plane handling data.

FIG. 4 is a diagram illustrating a configuration of a protocol stack of a radio interface in a user plane handling data.

As illustrated in FIG. 4, the radio interface protocol of the user plane includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding and decoding, modulation and demodulation, mapping and demapping of antennas, and mapping and demapping of resources. Data and control information are transmitted between the PHY layer of the UE 100 and the PHY layer of the gNB 200 via a physical channel.

The MAC layer performs priority control of data, a retransmission process through a hybrid ARQ (HARQ), a random access procedure, and the like. Data and control information are transmitted between the MAC layer of the UE 100 and the MAC layer of the gNB 200 via a transport channel. The MAC layer of the gNB 200 includes a scheduler. The scheduler determines a transport format (a transport block size, a modulation and coding scheme (MCS)) of uplink and downlink, and an allocation resource block for the UE 100.

The RLC layer transmits data to the RLC layer on the reception side by using the functions of the MAC layer and the PHY layer. Data and control information are transmitted between the RLC layer of the UE 100 and the RLC layer of the gNB 200 via a logical channel.

The PDCP layer performs header compression and decompression, and encryption and decryption.

The SDAP layer performs mapping between an IP flow which is a unit of QoS control by the core network and a radio bearer which is a unit of QoS control by an Access Stratum (AS). Note that, when the RAN is connected to the EPC, the SDAP may not be provided.

Figure 5:
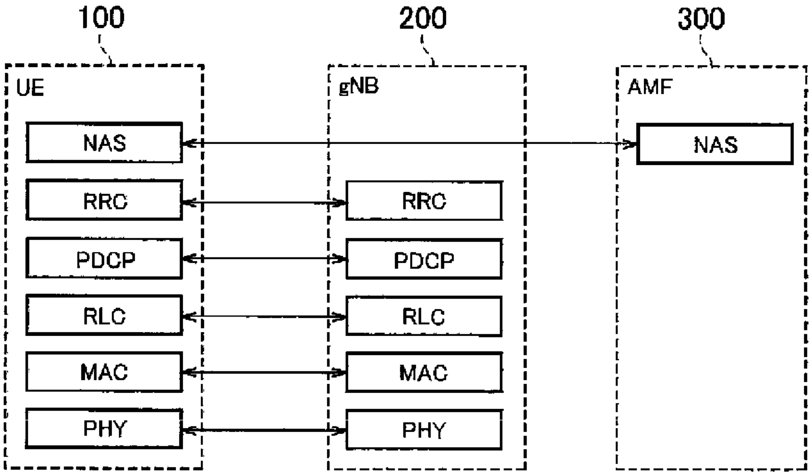
FIG. 5 is a diagram illustrating a configuration of a protocol stack of a radio interface for a control plane handling signaling (control signals).

FIG. 5 is a diagram illustrating a configuration of a protocol stack of a radio interface in a control plane handling signaling (control signals).

As illustrated in FIG. 5, the protocol stack of the radio interface in the control plane includes a Radio Resource Control (RRC) layer and a Non-Access Stratum (NAS) layer instead of the SDAP layer illustrated in FIG. 4.

RRC signaling for various configurations is transmitted between the RRC layer of the UE 100 and the RRC layer of the gNB 200. The RRC layer controls the logical channel, the transport channel, and the physical channel in response to establishment, re-establishment, and release of the radio bearer. When there is a connection between the RRC of the UE 100 and the RRC of the gNB 200 (RRC connection), the UE 100 is in an RRC connected state. When there is no connection (RRC connection) between the RRC of the UE 100 and the RRC of the gNB 200, the UE 100 is in an RRC idle state. Furthermore, when the RRC connection is interrupted (suspended), the UE 100 is in an RRC inactive state.

The NAS layer higher than the RRC layer performs session management, mobility management, and the like. NAS signaling is transmitted between the NAS layer of the UE 100 and the NAS layer of the AMF 300.

Note that the UE 100 has an application layer and the like other than the protocol of the radio interface.

Non-Public Cellular Network

Next, the non-public cellular network (Non-Public Network (NPN)) according to an embodiment will be described. The NPN is a small-scale cellular network that can be used by a specific subscriber. The NPN is, for example, used for the purpose of private wireless communication in a factory. The NPN may be referred to as a private network.

A public cellular network (Public Land Mobile Network (PLMN)) corresponding to a general cellular network is operated by a communication operator. For example, a communication operator that operates the PLMN is licensed on a nationwide basis.

On the other hand, the NPN can be flexibly constructed and utilized by various entities depending on local needs or individual needs in industrial fields. The NPN with the 5G cellular communication system may be referred to as local 5G. For example, general companies or organizations and individuals are allocated frequencies and allowed to operate NPNs by themselves. Licensing of the NPN may be limited to local areas, such as internal areas in facilities of general companies.

The NPN includes two types: a standalone NPN and a non-standalone NPN. The standalone NPN is referred to as the SNPN, and the non-standalone NPN is referred to as the Public Network Integrated NPN (PNI-NPN). Unless the SNPN and the PNI-NPN are particularly distinguished from each other, the SNPN and the PNI-NPN are hereinafter simply referred to as the NPNs.

Figure 6:
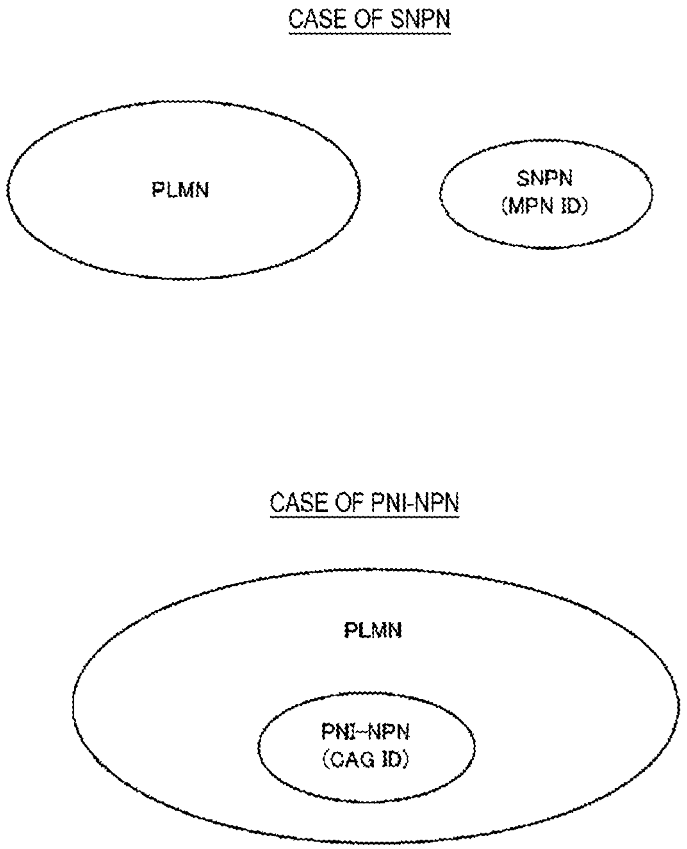
FIG. 6 is a diagram illustrating an SNPN and a PNI-NPN corresponding to non-public cellular networks according to an embodiment.

FIG. 6 is a diagram illustrating the SNPN and the PNI-NPN according to an embodiment.

As illustrated in FIG. 6, the SNPN is independent of the PLMN and does not depend on the network function of PLMN. On the other hand, the PNI-NPN is configured as a part of the PLMN and can perform network cooperation with the PLMN.

Note that each of the PLMN and the NPN may include an NG-RAN 10 and a 5GC 20. It is assumed that one or a plurality of frequencies (frequency bands or carrier frequencies) are allocated to one NPN. Further, one frequency may be allocated to a plurality of geographically separated NPNs. By separating the geographical areas of the NPNs using one frequency, the same frequency can be shared by the plurality of NPNs.

In the SNPN, an NPN ID is allocated to the NPN as a network identifier for identifying the NPN. The NPN cell (gNB 200) broadcasts the NPN ID of the NPN to which the NPN cell belongs (or the NPN for which the NPN cell provides service, or the NPN for which the NPN cell gives permission to access). A special PLMN ID for identifying the NPN may be allocated to the NPN, and the NPN cell (gNB 200) may broadcast the special PLMN ID.

In the PNI-NPN, a Closed Access Group (CAG) ID is allocated to the NPN as a network identifier for identifying the NPN. The NPN cell (gNB 200) broadcasts a CAG ID of the NPN to which the NPN cell belongs (or the NPN for which the NPN cell provides service, or the NPN for which the NPN cell gives permission to access). Note that the CAG ID is also an identifier of a group including a part of specific users that can access the NPN out of subscriber users of the PLMN. Note that the NPN ID may be allocated to the NPN instead of the CAG ID, and both of the NPN ID and the CAG ID may be allocated to the NPN.

Example of NPN Information Stored in SIM

Now, an example of the NPN information stored in the SIM 150 will be described. In an embodiment, in the SIM 150, information related to the NPN is stored. The information related to the NPN is stored in the SIM 150 in advance at the time point when the SIM 150 is provided.

FIG. 7 is a diagram illustrating the NPN information stored in the SIM 150 according to an embodiment.

As illustrated in FIG. 7, the SIM 150 stores the network identifier (NPN ID or CAG ID) for identifying the NPN given permission to access from the UE 100, and frequency information indicating a frequency (frequency band, carrier frequency) of the NPN. The NPN given permission to access from the UE 100 refers to the NPN to which the UE 100 subscribes, and the NPN that the UE 100 has the authority to access.

The UE 100 performs search processing, specifically cell search, for the NPN, based on the network identifier and the frequency information stored in the SIM. For example, the UE 100 searches for a cell that belongs to the frequency indicated by the frequency information stored in the SIM, and that broadcasts the network identifier the same as the network identifier stored in the SIM. In this manner, the UE 100 can efficiently detect the NPN cell given permission to access.

In the SIM 150, a plurality of sets of the network identifier and the frequency information may be stored. In this case, access priority may be configured for each network identifier. FIG. 7 illustrates an example in which two sets of the network identifier and the frequency information are stored in the SIM 150. Further, priority "1" is configured for the network identifier "ID #1", and priority "2" is configured for the network identifier "ID #2". Note that the priority need not be stored in the SIM 150 as explicit information. For example, the priority may be configured according to the order in which the network identifiers are arranged. The UE 100 selects any one set out of the plurality of sets (plurality of network identifiers), based on the configured access priority.

In the SIM 150, effective area information may be stored being associated with the frequency information. The effective area information may be information indicating a geographical position at which NPN service is permitted in a corresponding frequency. For example, the effective area information may be latitude and longitude and/or altitude, or may be a cell ID of a PLMN base station, a RAN area ID, and/or a tracking area ID. One or a plurality of pieces of effective area information are associated with one NPN ID or piece of frequency information. The UE 100 may identify the network identifier of the NPN and the frequency information effective regarding the position of the UE 100, based on the effective area information, and use the identified information for search processing.

Figure 8:
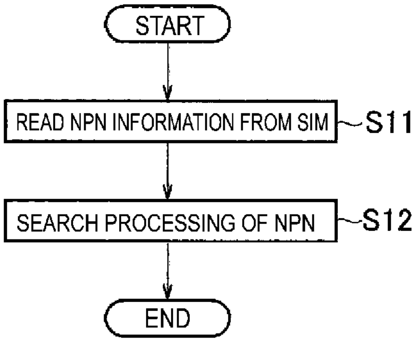
FIG. 8 is a diagram illustrating an operation example of the UE related to the SIM according to an embodiment.

FIG. 8 is a diagram illustrating an operation example of the UE 100 related to the SIM 150 according to an embodiment.

As illustrated in FIG. 8, in Step S11, an upper layer entity of the UE 100 reads the NPN information from the SIM 150. The upper layer entity refers to an entity of an upper layer of the RRC layer of the UE 100. The upper layer entity notifies an AS entity of the UE 100 of the read NPN information. The AS entity refers to an entity of the RRC layer or lower layers of the UE 100.

When a plurality of sets of the network identifier and the frequency information are stored in the SIM 150, the upper layer entity may select any one set out of the plurality of sets (plurality of network identifiers), based on the configured access priority, and notify the AS entity of the selected set.

When the AS entity of the UE 100 is notified of the NPN information (for example, a set of the network identifier and the frequency information) from the upper layer entity of the UE 100, the AS entity may determine that access to the cell of the NPN indicated by the network identifier is permitted.

In Step S12, the AS entity of the UE 100 performs search processing for the NPN, based on the NPN information notified from the upper layer entity of the UE 100.

Specifically, in operation of the cell selection, when the AS entity is provided with the frequency information from the upper layer entity, the AS entity performs search preferentially for the frequency indicated by the frequency information and detects the NPN ID (or CAG ID). The AS entity may notify the upper layer entity of the detected NPN ID (or CAG ID). If the AS entity has been provided with information of the NPN ID (or CAG ID) form the upper layer entity in advance, the AS entity may notify the upper layer entity of only an ID that matches the information that has been provided from the upper layer entity out of the detected NPN IDs (or CAG IDs). Based on the information notified from the AS entity, the upper layer entity can know an accessible network. Alternatively, final determination as to whether the upper layer entity can access or not may be performed.

Further, when the UE 100 performs cell reselection in the RRC idle state or the RRC inactive state, the AS entity of the UE 100 raises priority of the frequency (NPN frequency) indicated by the frequency information, based on the frequency information included in the NPN information notified from the upper layer entity. For example, the UE 100 may select an NPN cell through the operation of cell selection described above, and then raise priority of the frequency to which the currently selected NPN (NPN to which the currently selected cell belongs and/or currently camped NPN) belongs. The AS entity may configure the priority of the frequency (NPN frequency) indicated by the frequency information to the highest priority. Note that cell selection or cell reselection refers to selection or reselection of a cell to be used as a serving cell of the UE 100.

Thus, in cell reselection, even when the frequency of the current serving cell and the frequency of the NPN given permission to access are different from each other, the AS entity of the UE 100 can measure radio quality of the frequency of the NPN given permission to access and reselect a neighboring cell belonging to the frequency of the NPN as the serving cell of the UE 100.

Operation for Migration of UE from PLMN to NPN

Now, an operation for migration of the UE 100 from the PLMN to the NPN will be described.

In an embodiment, the gNB 200 belonging to the PLMN broadcasts a System Information Block (SIB) including NPN information corresponding to network information related to the NPN. Specifically, the gNB 200 that manages the PLMN cell broadcasts the NPN information related to the NPN associated with the PLMN cell to UEs 100 in the cell. In a case that the allocated frequency differs between the PLMN and the NPN, the gNB 200 that manages the PLMN cell may broadcast the NPN information as neighboring frequency information.

The NPN information includes at least one of the network identifier for identifying the NPN, the frequency information indicating the frequency (frequency band, carrier frequency) of the NPN, or the cell identifier of the NPN cell. The cell identifier may be a base station ID (gNB ID). The frequency information may include information indicating an initial Bandwidth Part (BWP) to be used for the first access. The BWP refers to a band part of a part of a frequency of a cell.

The information broadcast from the gNB 200 may include a beam ID or may include SSB information (a synchronization signal/broadcast channel block including a synchronization signal and a physical broadcast channel).

For example, in the SNPN, the gNB 200 that manages the PLMN cell broadcasts the NPN information related to the NPN (SNPN) geographically close to the cell. In the PNI-NPN, the gNB 200 that manages the PLMN cell broadcasts the NPN information related to the NPN (PNI-NPN) belonging to the same PLMN as that of the gNB 200.

The UE 100 receives the NPN information broadcast from the gNB 200 belonging to the PLMN, and performs search processing for the NPN, based on the received NPN information. For example, the UE 100 belongs to the frequency indicated by the frequency information included in the received NPN information, and searches for a cell to broadcast the network identifier the same as the network identifier included in the received NPN information. The UE 100 located in the cell of the gNB 200 belonging to the PLMN may exclude, from the target of the search processing, the NPN to which the NPN information is not broadcast from the gNB 200.

Figure 9:
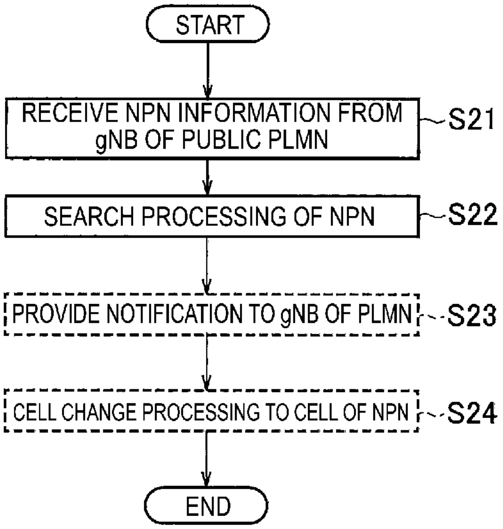
FIG. 9 is a diagram illustrating operations of the UE according to an embodiment.

FIG. 9 is a diagram illustrating operations of the UE 100 according to an embodiment.

As illustrated in FIG. 9, in step S21, the gNB 200 that manages the PLMN cell broadcasts, to the UEs 100 in the cell, the SIB including the NPN information related to the NPN associated with the cell. The UE 100 receives the NPN information from the gNB 200.

In Step S22, the UE 100 performs search processing for the NPN corresponding to the NPN information, based on the NPN information received from the gNB 200. For example, the UE 100 belongs to the frequency indicated by the frequency information included in the received NPN information, and searches for a cell to broadcast the network identifier that is the same as the network identifier included in the received NPN information. The UE 100 may exclude the NPN to which the NPN information is not broadcast from the gNB 200, from the target of the search processing.

Here, it may be assumed that the UE 100 performs the search processing only for the NPN in which the network identifier is stored in the SIM 150, specifically, the NPN given permission to access from the UE 100. Specifically, only in a case that the network identifier broadcast from the gNB 200 belonging to the PLMN matches the network identifier stored in the SIM 150, the search processing for the NPN indicated by the network identifier may be performed.

The following description is provided based on the assumption that the UE 100 has detected, through the search processing, an NPN cell of a search target.

When the UE 100 is in the RRC connected state, in Step S23, the UE 100 transmits, to the gNB 200, a notification including information (at least one of the network identifier, the frequency information, or the cell identifier) related to the NPN that the UE 100 requests to access. Specifically, in a case that the frequency differs between the PLMN and the NPN, the gNB 200 needs to configure inter frequency measurement for the UE 100 in order to perform quality measurement on the frequency of the NPN. Thus, the UE 100 notifies the gNB 200 of the request of the access to the NPN, in order for the gNB 200 to configure the inter frequency measurement. The UE 100 performs the inter frequency measurement based on the configuration from the gNB 200, and transmits, to the gNB 200, a measurement report including a measurement result. The gNB 200 determines to perform handover of the UE 100 to the cell of the NPN, based on the measurement report.

In Step S24, the UE 100 receives a handover indication from the gNB 200 that has determined to perform handover and performs handover to the cell of the NPN.

In contrast, when the UE 100 is in the RRC idle state or the RRC inactive state, the processing of Step S23 is not performed, and in Step S24, the UE 100 may configure the priority of the frequency (NPN frequency) indicated by the frequency information to the highest priority, based on the frequency information included in the NPN information received from the gNB 200. In this manner, the UE 100 can perform cell reselection to the cell of the NPN.

Note that, in a case of the SNPN, the gNB 200 belonging to the PLMN cannot perform handover of the UE 100 in an RRC connected state to the cell of the NPN (SNPN). Thus, the UE 100 in the RRC connected state may request the gNB 200 to release connection, when the NPN that the UE 100 desires to access is not included in the NPN information received from the gNB 200 and the UE 100 detects the NPN through the search processing. When the connection is released in response to the request, the UE 100 that has transitioned to the RRC idle state or the RRC inactive state configures the priority of the frequency of the detected NPN to the highest priority and can thereby perform cell reselection to the cell of the NPN.

Alternatively, the UE 100 may notify the gNB 200 belonging to the PLMN that the UE 100 has detected the desired NPN cell (or NPN frequency), and the gNB 200 may determine execution of redirection to the NPN cell (or NPN frequency) and indicate the execution to the UE 100.

Note that the operation for migration of the UE 100 from the PLMN to the NPN has been described; however, in contrast, the above-described operation may be applied to a case of migration of the UE 100 from the NPN to the PLMN. In this case, because the direction of migration is the opposite, the "gNB belonging to the PLMN" in the above description is interpreted as the "gNB belonging to the NPN", the "gNB belonging to the NPN" in the above description is interpreted as the "gNB belonging to the PLMN", and the "NPN information" in the above description is interpreted as the "PLMN information". In this case, the gNB 200 belonging to the NPN broadcasts the PLMN information of the neighboring frequency, for example.

In an embodiment, the gNB 200*a* belonging to the PLMN may transmit, to the UE 100, the NPN information that further includes information indicating the presence or absence of an inter-base station interface between the gNB 200*b* belonging to the NPN and the gNB 200*a*. The inter-base station interface is, for example, an Xn interface, but may be an X2 interface. Thus, in a case that a radio link failure (RLF) occurs between the gNB 200*a* belonging to the PLMN and the UE 100, whether connection re-establishment with the gNB 200*a* (specifically, RRC re-establishment) can be achieved can be determined.

Figure 10:
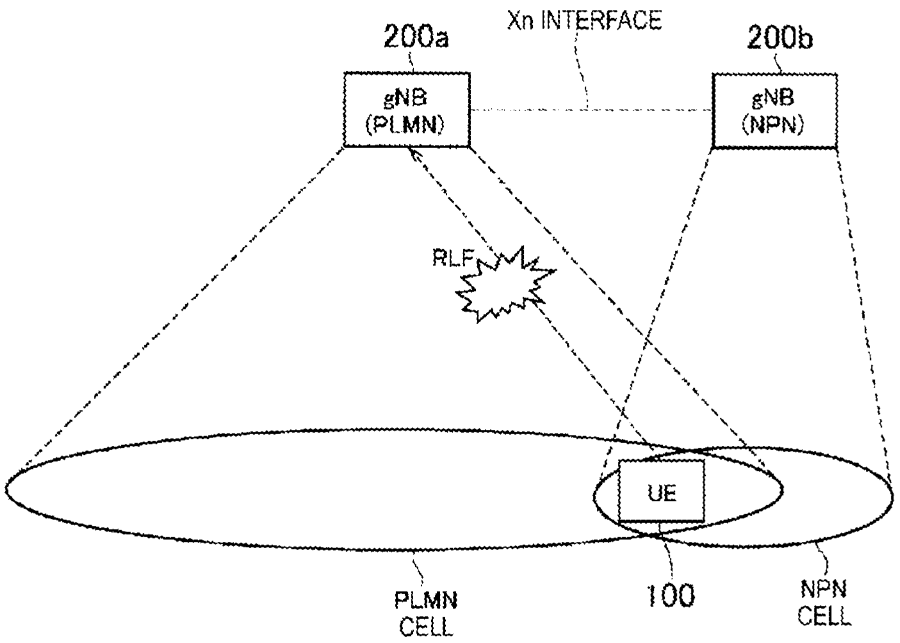
FIG. 10 is a diagram illustrating operations of a cellular communication system according to an embodiment.

FIG. 10 is a diagram illustrating operations of a cellular communication system 1 according to an embodiment.

In the example illustrated in FIG. 10, the UE 100 having RRC connection with the gNB 200*a* belonging to the PLMN detects an RLF with the gNB 200*a*. After detecting the RLF with the gNB 200*a*, the UE 100 can continue communication in a case of succeeding in the RRC re-establishment with the gNB 200*a*. Here, in order for the UE 100 to smoothly achieve RRC re-establishment with the gNB 200*a*, an inter-base station interface (Xn interface) needs to be provided between the gNB 200*a* and the gNB 200*b*, and the gNB 200*b* needs to acquire context information of the UE 100 from the gNB 200*a*.

However, in a case that the NPN to which the gNB 200*b* belongs is an SNPN, there is no network cooperation between the gNB 200*a* and the gNB 200*b*, and the gNB 200*b* cannot acquire the context information of the UE 100 from the gNB 200*a*. Even though the NPN to which the gNB 200*b* belongs is a PNI-NPN, in some cases, no inter-base station interface is provided between the gNB 200*a* and the gNB 200*b*.

Thus, the gNB 200*a* broadcasts NPN information including information indicating the presence or absence of an inter-base station interface with the gNB 200*b*. After detecting the RLF, the UE 100 determines that RRC re-establishment with the gNB 200*b* can be smoothly achieved in a case that an inter-base station interface is provided between the gNB 200*a* and the gNB 200*b*. In this case, the UE 100 preferentially selects the gNB 200*b* as a candidate for RRC re-establishment and transmits an RRC re-establishment request message to the gNB 200*b*. On the other hand, after the UE 100 detects the RLF, in a case that no inter-base station interface is provided between the gNB 200*a* and the gNB 200*b*, the UE 100 may determine that RRC re-establishment with the gNB 200*b* cannot be smoothly achieved and lower the priority of the gNB 200*b* as a candidate for RRC re-establishment. In a case that the gNB 200*b* with no inter-base station interface is selected, the UE 100 may transmit an RRC setup request message to the gNB 200*b*.

Migration from the PLMN to the NPN has been described; however, such an operation may be applied to an operation from the NPN to the PLMN.

Operations Related to RRC Inactive State

Figure 11:
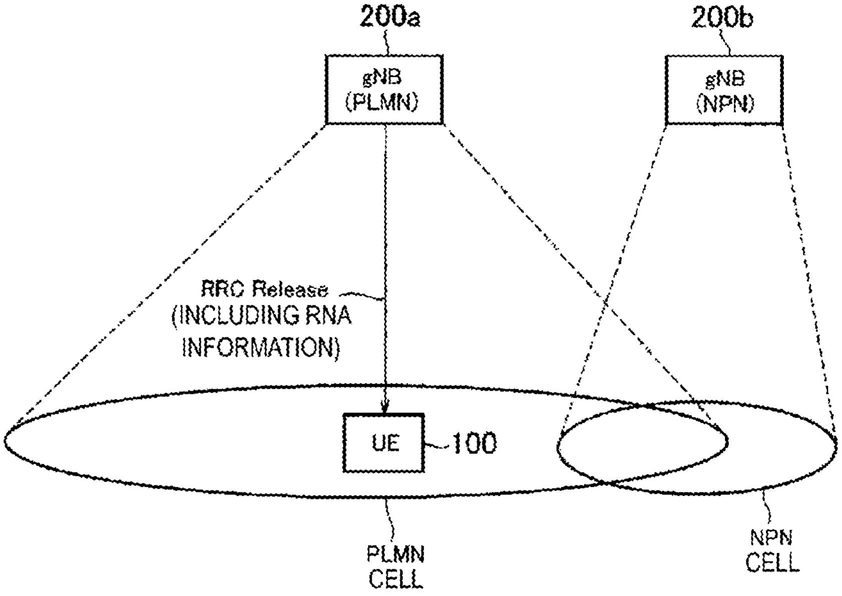
FIG. 11 is a diagram illustrating operations related to an RRC inactive state according to an embodiment.

Now, operations related to the RRC inactive state according to an embodiment will be described with focus placed on differences from the above-described embodiments. FIG. 11 is a diagram illustrating operations related to the RRC inactive state according to an embodiment.

As illustrated in FIG. 11, in order to transition the UE 100 to the RRC inactive state, the gNB 200*a* belonging to the PLMN transmits, to the UE 100, an RRC Release message including a configuration for the RRC inactive state (SuspendConfig). SuspendConfig includes RAN Notification Area (RNA) information. RNA is an area in which the UE 100 can perform UE based mobility (e. g., cell reselection operation) while the UE 100 remains in the RRC inactive state, and is indicated by, for example, a list of cells corresponding to the area. The gNB 200*a* belonging to the PLMN notifies the UE 100 of the NPN information (e.g., NPN ID, CAG ID) by using the RNA information included in the RRC Release message.

This enables the RNA to be extended to the NPN cell, and the UE maintains the RRC inactive state, allowing migration from the PLMN to the NPN.

The RNA information may indicate priority information for each PLMN/NPN and/or for each cell. For example, in a case that the NPN is configured with a higher priority than the PLMN, the UE 100 prioritizes, in the cell reselection operation, the cell belonging to the NPN.

For example, the UE 100 evaluates cell reselection by adding an offset value to the radio measurement value of the cell belonging to the NPN. Alternatively, the UE 100 measures only the cell (or frequency) belonging to the NPN and measures the cell (or frequency) belonging to the PLMN in a case that the appropriate cell cannot be detected in the cell (or frequency) belonging to the NPN.

Operation for Migration of UE from NPN to PLMN

Now, an operation for migration of the UE 100 from the NPN to the PLMN will be described with focus placed on differences from the above-described operation.

Figure 12:
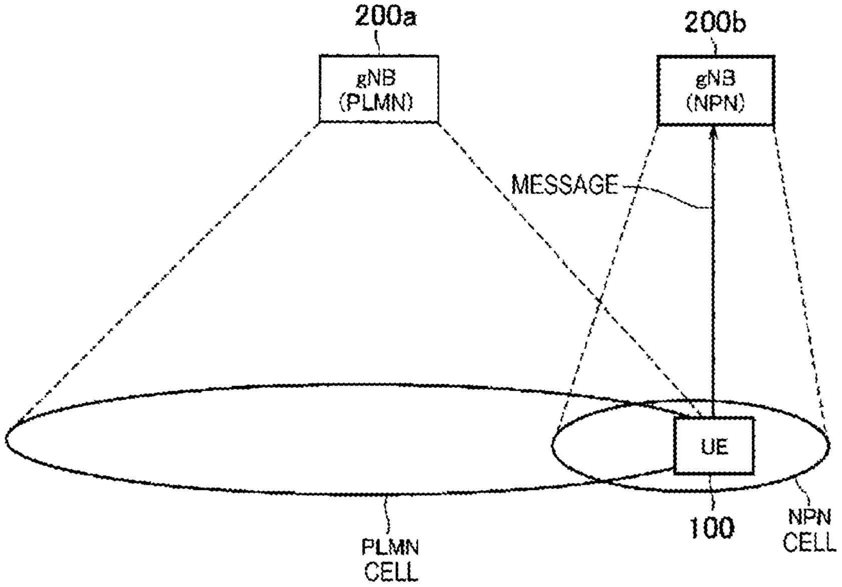
FIG. 12 is a diagram illustrating operations of a cellular communication system according to an embodiment.

FIG. 12 is a diagram illustrating operations of the cellular communication system 1 according to an embodiment.

As illustrated in FIG. 12, in a case of desiring to switch the connection network to the PLMN, the UE 100 in the RRC connected state, which is connected to the gNB 200*b* belonging to the NPN, transmits, to the gNB 200*b*, a message for the UE 100 to perform connection switching from NPN to PLMN. Based on a user operation for selecting the PLMN or a user operation for determining not to select the NPN, the UE 100 may determine whether the connection network needs to be switched from the NPN to the PLMN.

Note that in a case that the UE 100 is connected to the PLMN, the UE 100 may determine the message not to be transmitted. For example, even in a case that the user operation is used to determine not to select the NPN, the UE 100 determines that the connection network need not be switched, and the message is not transmitted in a case that the UE 100 is being connected to the PLMN. This allows saving of power required for message transmission and of radio resources.

Alternatively, the UE 100 may transmit the message even in a case that the UE 100 is connected to the PLMN. For example, the UE 100 transmits the message in a case of transmitting, in advance to the gNB 200*a* belonging to the PLMN, information (preference) indicating the desire to connect to the NPN. Thus, the gNB 200*a* belonging to the PLMN can perform control such as a change in measurement configuration for the gNB 200*b* belonging to the NPN or suppression of handover.

The message may be an RRC message (e.g., a UE Assistance Information message). The message may include information indicating that the network identifier (NPN ID or CAG ID) of the NPN is not specified. Such information may include a NULL value (or zero value) configured as an NPN ID or a CAG ID.

Based on the message received from the UE 100, the gNB 200*b* performs control (i.e., mobility control) for connection switching from the gNB 200*b* belonging to the NPN to the gNB 200*a* belonging to the PLMN.

For example, the gNB 200*b* performs control for handover of the UE 100 to the gNB 200*a* in a case that the gNB 200*b* is a PNI-NPN and that there is network cooperation between the gNB 200*b* and the gNB 200*a*, to which the UE 100 is to be handed over. In this regard, in a case that the frequency differs between the PLMN and the NPN, the gNB 200*b* configures inter frequency measurement for the UE 100 in order to perform quality measurement on the frequency of the PLMN. The UE 100 performs the inter frequency measurement based on the configuration from the gNB 200*b*, and transmits, to the gNB 200*b*, a measurement report including a measurement result. Based on the measurement report, the gNB 200*b* hands over the UE 100 to the cell of the gNB 200*a* (PLMN cell).

On the other hand, in a case that the gNB 200*b* is an SNPN and that there is no network cooperation between the gNB 200*b* and the gNB 200*a*, to which the UE 100 is to be handed over, then the gNB 200*b* may release the RRC connection between the UE 100 and the gNB 200*b* in order to enable the UE 100 to connect to the gNB 200*a*. In this case, the UE 100 establishes an RRC connection with the gNB 200*a* after the RRC connection between the UE 100 and the gNB 200*b* is released.

Alternatively, the UE 100 may determine whether there is network cooperation between the gNB 200*b* (NPN) and the gNB 200*a* (PLMN), to which the UE 100 is to be handed over, and may determine the content of the message depending on whether there is network cooperation. For example, in a case that there is network cooperation, the UE 100 transmits, to the gNB 200*b*, a message including a handover request for handover of the UE 100 from the gNB 200*b* to the gNB 200*a*. On the other hand, in a case that there is no network cooperation, the UE 100 transmits, to the gNB 200*b*, a message including a disconnection request for disconnection of the gNB 200*b* from the UE 100.

In this regard, the UE 100 may determine whether there is network cooperation between the gNB 200*a* and the gNB 200*b* based on the notification from the gNB 200*b*. For example, the gNB 200*b* broadcasts system information including information indicating whether there is network cooperation. Such information may include a network identifier (for example, PLMN ID), a gNB identifier and/or a cell identifier related to the gNB 200*a*.

The AS entity of the UE 100 may determine whether there is network cooperation between the gNB 200*a* and the gNB 200*b* based on a notification from the upper layer entity of the UE 100. For example, in a case that the network identifier (e.g., PLMN ID), gNB identifier, and/or cell identifier of the gNB 200*a* (PLMN) corresponding to the network cooperation are configured by the user configuration, the upper layer entity acquires this configuration information and notifies the information acquired to the AS entity.

Operations Performed when Single Cell is Shared

Now, operations will be described that are performed in a case that a plurality of cellular networks share a single cell.

Figure 13:
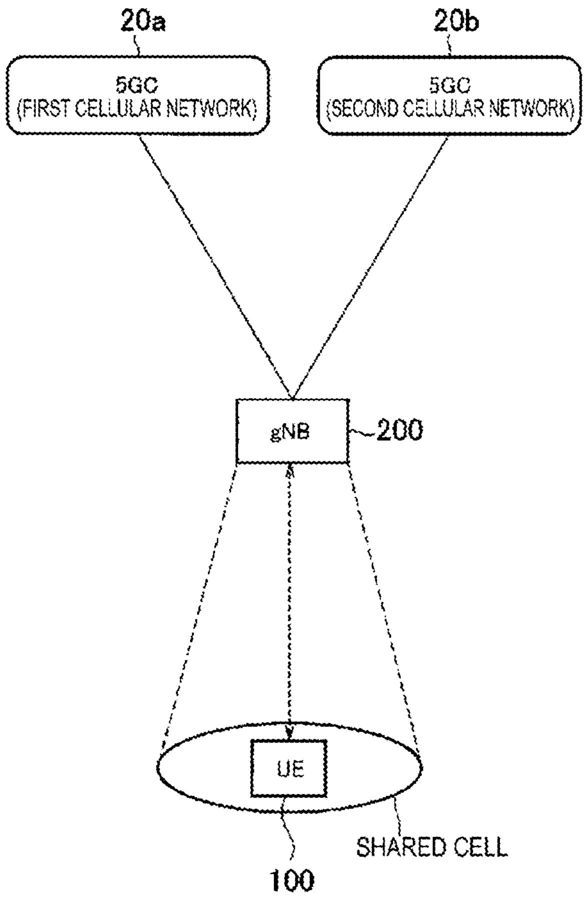
FIG. 13 is a diagram illustrating operations of a cellular communication system according to an embodiment.

FIG. 13 is a diagram illustrating operations of the cellular communication system 1 according to an embodiment.

As illustrated in FIG. 13, the gNB 200 manages a cell shared by a first cellular network and a second cellular network (hereinafter referred to as the "shared cell"). The gNB 200 can be considered as a shared gNB shared by a 5GC 20*a* belonging to the first cellular network and a 5GC 20*b* belonging to the second cellular network, that is, a gNB belonging to both the first cellular network and the second cellular network.

For example, in a case that the shared cell is shared by the SNPN and PNI-NPN, the gNB 200 broadcasts both the network identifier (e.g., NPN ID) of the SNPN and the network identifier (e.g., CAG ID) of the PNI-NPN by using the shared cell.

In this regard, the first cellular network is one cellular network of three cellular networks, i.e., the PLMN, the SNPN, and the PNI-NPN. The second cellular network is one of two cellular networks obtained by excluding the above-described one cellular network from the above-described three cellular networks. For example, the first cellular network may be the SNPN, and the second cellular network may be the PNI-NPN or the PLMN.

In such an operating environment, when the UE 100 connects to the gNB 200, the gNB 200 cannot connect the UE 100 to a desired cellular network in a case that which cellular network the UE 100 desires to connect to is unknown.

Thus, when the UE 100 connects to the gNB 200, the UE 100 transmits, to the gNB 200, information for designating either one of the first cellular network or the second cellular network as the connection destination network of the UE 100 (the information is hereinafter referred to as the "network selection information"). Thus, the gNB 200 easily determines, based on the network selection information, which cellular network the UE 100 desires to connect to, and connects the UE 100 to the desired cellular network.

The network selection information may be the network identifier (NPN ID or CAG ID) of the NPN. Alternatively, the network selection information may be the network type identifier indicating one of the three network types, i.e., the PLMN, the SNPN, and the PNI-NPN. Thus, even in a case that the first cellular network is an SNPN and the second cellular network is a PNI-NPN, the gNB 200 can determine, based on the network selection information, which cellular network the UE 100 desires to connect to.

Assuming that the first cellular network is a PLMN and the second cellular network is the NPN (SNPN or PNI-NPN), the UE 100 may transmit, as the network selection information, a flag indicating one of the PLMN and the NPN. For example, in a case of desiring to connect to the NPN, the UE 100 transmits, as the network selection information, a 1-bit flag indicating the NPN. On the other hand, in a case of desiring to connect to the PLMN, the UE 100 does not transmit the flag as the network selection information. Thus, the gNB 200 can determine which cellular network the UE 100 desires to connect to. Such a flag can be considered as a form of network type identifier.

Assuming that a third cellular network is further present as well as the first cellar network and the second cellar network and that the UE 100 may desire to connect to a plurality of cellular networks, the flag may be transmitted in a list format. Each entry in the list may be linked with each entry in an information list of broadcast network identifiers (PLMN IDs or NPN IDs (or CAG IDs)). Alternatively, assuming that a third cellular network is further present as well as the first cellar network and the second cellar network and that the UE 100 desires to connect to one cellular network, an entry number in the information list of network identifiers may be notified as the network to which the UE 100 desires to connect. For example, in a case of desiring to connect to the NPN with entry number 2, the UE 100 notifies "2" as the network to which the UE 100 desires to connect.

The UE 100 in the RRC idle state may transmit the network selection information to the gNB 200 during a random access procedure for establishing an RRC connection. The UE 100 in the RRC inactive state may transmit the network selection information to the gNB 200 during a random access procedure for recovering an RRC connection. Alternatively, the UE 100 may transmit network selection information to the gNB 200 after transitioning to the RRC connected state.

The UE 100 transmits, during the random access procedure, a random access preamble (Msg 1) and an RRC message (Msg 3, Msg 5) to the gNB 200. The UE 100 transmits the network selection information to the gNB 200 in any of Msg 1, Msg 3, and Msg 5.

In a case that the network selection information is transmitted using Msg 1, a Physical Random Access Channel (PRACH) resource is split for each of the respective network type identifiers, and the UE 100 selects a PRACH resource corresponding to the network type identifier desired by the UE 100, and transmits Msg 1 to the gNB 200 in the selected PRACH resource. The gNB 200 can interpret, as a network type identifier, the PRACH resource selected by the UE 100, and determine which cellular network the UE 100 desires to connect to. In a case of transmitting the network selection information using Msg 3 or Msg 5, the UE 100 transmits, to the gNB 200, an RRC message including the network selection information such as the network type identifier.

In response to determining, based on the network selection information, the connection destination cellular network desired by the UE 100, the gNB 200 establishes a network connection (routing path) to the connection destination cellular network. After completing connection of the UE 100, the gNB 200 may store the network selection information as a part of the context information of the UE 100. In controlling handover of the UE 100, the gNB 200 may select a cellular network intended for handover based on the network selection information stored.

Now, network switching processing will be described that corresponds to processing for switching the connection destination network of the UE 100 in an operating environment illustrated in FIG. 13.

In the operating environment illustrated in FIG. 13, the UE 100 connected to the first cellular network (5GC 20*a*) via the gNB 200 performs network switching processing for switching from the first cellular network to the second cellular network without changing the shared cell, used as the current serving cell. In other words, the UE 100 performs the network switching processing for switching from the first cellular network to the second cellular network without using a handover procedure (including the random access procedure).

Figure 14:
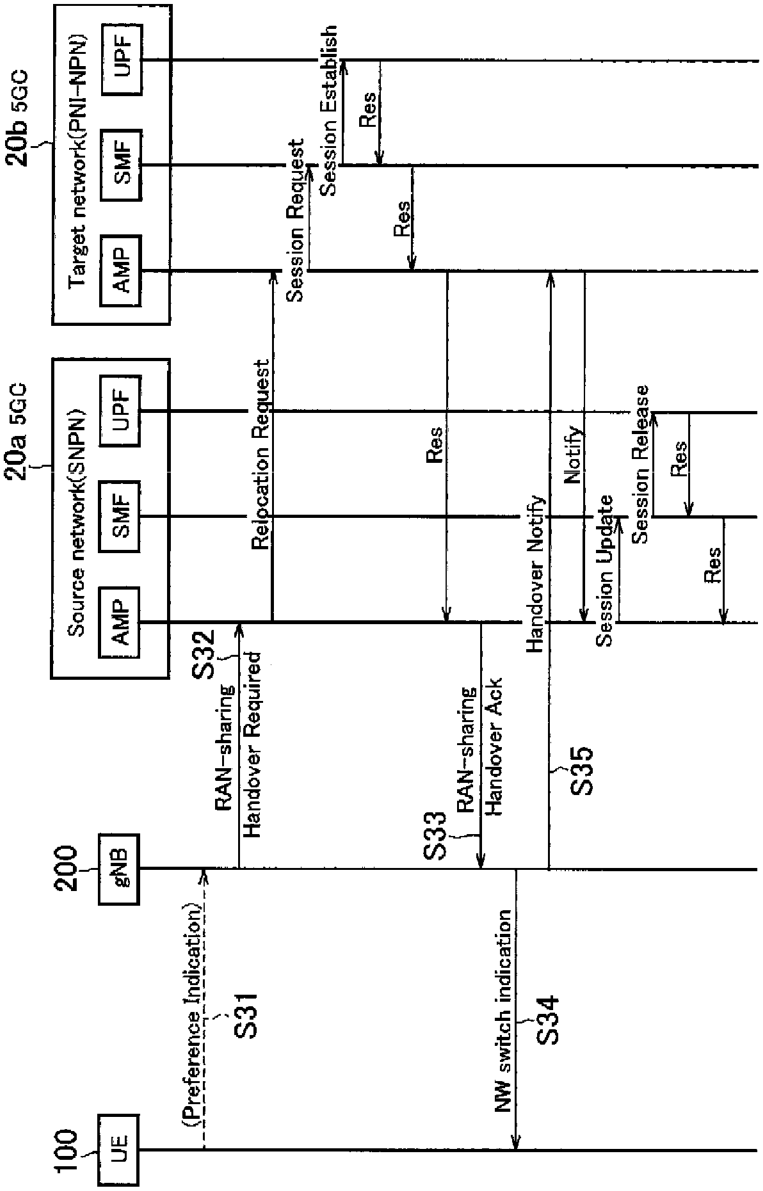
FIG. 14 is a diagram illustrating network switching processing according to an embodiment.

FIG. 14 is a diagram illustrating the network switching processing according to an embodiment. FIG. 14 illustrates an example in which the first cellular network is an SNPN, whereas the second cellular network is a PNI-NPN. Before step S31, the UE 100 is in a state where the connection to the SNPN is complete.

As illustrated in FIG. 14, in step S31, the UE 100 requests network switching by notifying the gNB 200 of the switching destination cellular network desired by the UE 100 (Preference Indication).

In step S32, the gNB 200 notifies the 5GC 20*a* of the switching destination cellular network desired by the UE 100 (RAN-sharing Handover Required).

The 5GC 20*a* requests the 5GC 20*b*, corresponding to the switching destination cellular network desired by the UE 100, to change the connection destination network of the UE 100, and receives an acknowledgment from the 5GC 20*b* after processing in 5GC 20*b* is complete. This completes preparation for switching the routing path between the gNB 200 and the 5GC 20*a* to the routing path between the gNB 200 and the 5GC 20*b*.

In step S33, the 5GC 20*a* transmits, to the gNB 200, an acknowledgment corresponding to the RAN-sharing Handover Required received in step S32 (RAN-sharing Handover Ack).

In step S34, the gNB 200 transmits, to the UE 100, a notification indicating that the gNB 200 is to perform network switching (NW switch indication). The UE 100 recognizes that the network switching has been performed with wireless connection unchanged. The NW switch indication may be an RRC message. The AS entity of the UE 100 may notify the network switching to the upper layer entity of the UE 100.

In step S35, the gNB 200 notifies 5GC 20*b* that the routing path is switched to the one between the gNB 200 and the 5GC 20*b* (Handover Notify). Subsequently, switching to the routing path between the gNB 200 and the 5GC 20*b* is performed.

OTHER EMBODIMENTS

In the embodiments described above, no particular reference is made to network slices, but the network may be logically divided into a plurality of slices. 5G assumes that a variety of user equipment is connected to the cellular network, and diverse services need to be supported that have different requirements such as fast speed, high capacity, high reliability, and/or low latency. Thus, 5GC may be theoretically divided into a plurality of slices corresponding to different services (service requirements).

In this regard, each slice is allocated an identifier referred to as a Single-Network Slice Selection Assistance Information (S-NSSAI). Each slice is associated with one service type (SST). For the service types, standards have been defined as eMBB (fast speed and high capacity), mIoT (multi-connectivity, power saving, low cost), and URLLC (low latency, high reliability). However, service types can be used for which no standards are defined.

In a case that non-public cellular networks are constructed for the purpose of providing particular services, then the types (SST) of services provided by the non-public cellular network may be limited. On the other hand, public cellular networks provide general-purpose services, but in some cases, do not provide special services corresponding to local needs or individual needs in industrial fields. Note that the "service provided by the cellular communication network" can be considered as the "function supported by the cellular communication network".

In the embodiments described above, the gNB 200 may broadcast system information including the network identifier (NPN ID or CAG ID) allocated to the NPN and the service type identifier indicating the type of the service provided by the NPN. The service type identifier available may include, for example, SST or S-NSSAI. In other words, the gNB 200 broadcasts a supported service type (network slice information) for each NPN network identifier. The gNB 200 may broadcast NPN network identifiers for each network slice.

The UE 100 selects, based on such system information, an NPN providing a predetermined type of service (e.g., the service desired by the UE 100) as a network (serving network) to which the UE 100 is to be connected. Such system information may be a type of NPN information described above. In this case, the NPN information may include the network identifier identifying the NPN, frequency information indicating the frequency of the NPN, and/or the cell identifier of the cell of the NPN, and the service type identifier of the NPN.

For example, the UE 100 in the RRC idle state or the RRC connected state preferentially selects, in the cell reselection, the cell of the NPN that provides a service desired by the UE 100. Such cell reselection control may be implemented by configuring the frequency of the NPN as a frequency with the highest priority for the cell reselection.

In the embodiments described above, no particular reference has been made to a conditional handover, but a conditional handover may be configured for the UE 100. The conditional handover is a handover on which conditions for performing the handover are imposed, and the UE 100 executes the handover when the conditions are satisfied. In a case that the conditional handover is configured, a plurality of target gNB candidates may be provided. The target gNB candidate may also be a gNB belonging to the NPN, as well as a gNB belonging to the PLMN. In this case, the gNB 200 may notify, in the handover configuration of the conditional handover, the priority of each target gNB candidate and/or each target network (PLMN and NPN) to the UE 100. Based on the priority configuration, the UE 100 may give priority to the target gNB and network in measurement or selection (e.g., ordering).

A program causing a computer to execute each of the processes performed by the UE 100 or the gNB 200 may be provided. The program may be recorded on a computer-readable medium. Use of the computer-readable medium enables the program to be installed on a computer. Here, the computer-readable medium on which the program is recorded may be a non-transitory recording medium. The non-transitory recording medium is not particularly limited, and may be, for example, a recording medium such as a CD-ROM, a DVD-ROM, or the like.

In addition, circuits for executing the processes to be performed by the UE 100 or the gNB 200 may be integrated, and at least part of the UE 100 or the gNB 200 may be configured as a semiconductor integrated circuit (a chipset or an SoC).

Although an embodiment has been described in detail with reference to the drawings, a specific configuration is not limited to those described above, and various design modifications and the like can be made without departing from the gist.

The invention claimed is:

1. A communication control method comprising:

receiving, by a user equipment, system information broadcast from a base station, the system information including: a cell identifier allocated to a cell belonging to an NPN (Non-Public Network); network slice identification information identifying a network slice supported by the cell; and frequency information indicating a frequency associated with the network slice identification information; and selecting, by a user equipment, based on the system information, the cell supporting a predetermined network slice as a serving cell of the user equipment, wherein the user equipment includes an AS (Access Stratum) layer and a NAS (Non-Access Stratum) layer which is an upper layer of the AS, the NAS layer is configured to receive a network slice ID from an apparatus other than the base station, and the AS layer is configured to receive the network slice ID from the NAS layer, and in response to receiving the network slice ID from the NAS layer, reselect another cell of the NPN according to a rule, the rule being that a frequency supporting a network slice identified by the network slice ID has higher priority than a frequency supporting none of network slices identified by network slice IDs received from the NAS.

2. The communication control method according to claim 1, wherein the system information further includes an identifier of the NPN and an identifier of a Public Land Mobile Network (PLMN), the user equipment is configured to select the NPN instead of the PLMN based on the identifier of the NPN included in the system information, when transitioning from a Radio Resource Control (RRC) inactive state to an RRC connected state.

3. A user equipment comprising:

a receiver configured to receive system information broadcast from a base station, the system information including a cell identifier allocated to a cell belonging to an NPN (Non-Public Network); network slice identification information identifying a network slice supported by the cell; and frequency information indicating a frequency associated with the network slice identification information; and a controller configured to select, based on the system information, the cell supporting a predetermined network slice as a serving cell of the user equipment, wherein the user equipment includes an AS (Access Stratum) layer and a NAS (Non-Access Stratum) layer which is an upper layer of the AS, the NAS layer is configured to receive a network slice ID from an apparatus other than the base station, and the AS layer is configured to receive the network slice ID from the NAS layer, and in response to receiving the network slice ID from the NAS layer, reselect another cell of the NPN according to a rule, the rule being that a frequency supporting a network slice identified by the network slice ID has higher priority than a frequency supporting none of network slices identified by network slice IDs received from the NAS.

4. An apparatus for controlling a user equipment, the apparatus comprising:

a processor and a memory, the processor configured to receive system information broadcast from a base station, the system information including a cell identifier allocated to a cell belonging to an NPN (Non-Public Network); network slice identification information identifying a network slice supported by the cell; and frequency information indicating a frequency associated with the network slice identification information; and select, based on the system information, the cell supporting a predetermined network slice as a serving cell of the user equipment, wherein the user equipment includes an AS (Access Stratum) layer and a NAS (Non-Access Stratum) layer which is an upper layer of the AS, the apparatus controls the NAS layer to receive a network slice ID from an apparatus other than the base station, the apparatus controls the AS layer to receive the network slice ID from the NAS layer, and the apparatus controls the AS layer to, in response to receiving the network slice ID from the NAS layer, reselect another cell of the NPN according to a rule, the rule being that a frequency supporting a network slice identified by the network slice ID has higher priority than a frequency supporting none of network slices identified by network slice IDs received from the NAS.

5. The communication control method according to claim 1, further comprising:

selecting, by the user equipment, the predetermined network slice.

6. A non-transitory computer-readable medium comprising, stored thereupon, computer program instructions for execution by a user equipment, the program instructions being configured to cause the user equipment to execute processing of:

receiving system information broadcast from a base station, the system information including a cell identifier allocated to a cell belonging to an NPN (Non-Public Network); network slice identification information identifying a network slice supported by the cell; and frequency information indicating a frequency associated with the network slice identification information; and selecting, based on the system information, the cell supporting a predetermined network slice as a serving cell of the user equipment, wherein the user equipment includes an AS (Access Stratum) layer and a NAS (Non-Access Stratum) layer which is an upper layer of the AS, the NAS layer is configured to receive a network slice ID from an apparatus other than the base station, the AS layer is configured to receive the network slice ID from the NAS layer, and in response to receiving the network slice ID from the NAS layer, reselect another cell of the NPN according to a rule, the rule being that a frequency supporting a network slice identified by the network slice ID has higher priority than a frequency supporting none of network slices identified by network slice IDs received from the NAS.

7. A mobile communication system comprises: a base station; and a user equipment, wherein the base station is configured to broadcast, system information including: a cell identifier allocated to a cell belonging to an NPN (Non-Public Network); network slice identification information identifying a network slice supported by the cell; and frequency information indicating a frequency associated with the network slice identification information, the user equipment is configured to select based on the system information, the cell supporting a predetermined network slice as a serving cell of the user equipment, the user equipment includes an AS (Access Stratum) layer and a NAS (Non-Access Stratum) layer which is an upper layer of the AS, the NAS layer is configured to receive a network slice ID from an apparatus other than the base station, the AS layer is configured to receive the network slice ID from the NAS layer, and in response to receiving the network slice ID from the NAS layer, reselect another cell of the NPN according to a rule, the rule being that a frequency supporting a network slice identified by the network slice ID has higher priority than a frequency supporting none of network slices identified by network slice IDs received from the NAS.

* * * * *